United States Patent
Hsu

(10) Patent No.: US 7,967,156 B2
(45) Date of Patent: Jun. 28, 2011

(54) STORAGE RACK

(75) Inventor: Li-Han Hsu, Lomita, CA (US)

(73) Assignee: Seville Classics Inc., Torrance, CA (US)

( * ) Notice: Subject to any disclaimer, the term of this patent is extended or adjusted under 35 U.S.C. 154(b) by 555 days.

(21) Appl. No.: 12/214,871

(22) Filed: Jun. 23, 2008

(65) Prior Publication Data

US 2009/0314731 A1 Dec. 24, 2009

(51) Int. Cl.
*A47B 43/00* (2006.01)

(52) U.S. Cl. .................. 211/187; 211/192

(58) Field of Classification Search .......... 211/186, 211/187, 134, 190, 207, 175, 192, 90.03, 211/183, 181.1; 108/185–187, 147.12, 147.15, 108/110; 312/265.1–265.4, 4–6, 1, 107, 312/108; 403/206–209, 213; 248/302

See application file for complete search history.

(56) References Cited

U.S. PATENT DOCUMENTS

| | | | |
|---|---|---|---|
| 1,847,066 A | 3/1932 | Berg | |
| 2,639,819 A | 5/1953 | Marks | |
| 2,943,899 A | 7/1960 | Beller | |
| 4,079,678 A * | 3/1978 | Champagne | 108/110 |
| 4,270,816 A * | 6/1981 | Erickson et al. | 312/3 |
| 4,382,640 A * | 5/1983 | Kashden | 312/5 |
| 4,765,495 A | 8/1988 | Bisk | |
| 4,996,929 A * | 3/1991 | Saal | 108/107 |
| 5,221,014 A * | 6/1993 | Welch et al. | 211/187 |
| 5,251,973 A | 10/1993 | Hazan | |
| 5,542,530 A | 8/1996 | Freelander | |
| 5,601,038 A * | 2/1997 | Welch et al. | 108/193 |
| 5,622,415 A * | 4/1997 | Felsenthal et al. | 312/265.4 |
| 5,695,078 A * | 12/1997 | Otema | 211/103 |
| 5,960,968 A * | 10/1999 | Wang | 211/187 |
| 6,116,164 A | 9/2000 | Justen, Jr. | |
| 6,123,209 A * | 9/2000 | Tseng | 211/186 |
| 6,142,589 A * | 11/2000 | Wang | 312/6 |
| 6,164,466 A * | 12/2000 | Baradat | 211/186 |
| 6,173,847 B1 * | 1/2001 | Zellner et al. | 211/186 |
| 6,253,933 B1 * | 7/2001 | Yang | 211/187 |
| 6,431,090 B1 * | 8/2002 | Davis et al. | 108/107 |
| 6,467,613 B2 | 10/2002 | Felsenthal | |
| 6,581,786 B1 | 6/2003 | King et al. | |
| 6,637,609 B2 | 10/2003 | Stevens | |
| 6,648,155 B1 * | 11/2003 | Wang | 211/187 |
| 6,688,478 B2 * | 2/2004 | Miller et al. | 211/59.2 |
| 6,719,157 B2 | 4/2004 | Stoddart et al. | |
| 6,732,659 B2 | 5/2004 | Poon | |
| 6,814,418 B2 | 11/2004 | D'Orso | |
| 7,059,484 B1 * | 6/2006 | Goldberg | 211/187 |
| 7,478,971 B2 * | 1/2009 | Li | 403/398 |
| 7,832,571 B2 * | 11/2010 | Felsenthal | 211/134 |
| 2006/0032829 A1 * | 2/2006 | Hutzler | 211/187 |
| 2007/0023376 A1 * | 2/2007 | Black | 211/187 |

(Continued)

*Primary Examiner* — Jennifer E. Novosad
(74) *Attorney, Agent, or Firm* — Raymond Sun

(57) ABSTRACT

A storage system includes a rear frame, a plurality of divider panels, and a plurality of shelving panels. The divider panels include a first divider panel and a second divider panel, each divider panel having a front vertical bar and a rear vertical bar, each divider panel being removably connected to the rear frame adjacent the rear vertical bar. A plurality of U-shaped connectors are provided in spaced apart manner along the front vertical bars and the rear vertical bars of each divider panel. Each shelving panel has a four-sided configuration that defines four corners, with each corner of each shelving panel fitted inside a U-shaped connector.

15 Claims, 5 Drawing Sheets

U.S. PATENT DOCUMENTS

2007/0108147 A1* 5/2007 Chen .............................. 211/187
2008/0142463 A1* 6/2008 Johnson ........................ 211/187
2009/0014400 A1* 1/2009 Nawrocki ................... 211/90.03
2010/0252520 A1* 10/2010 Hsu .............................. 211/186

* cited by examiner

STORAGE RACK

BACKGROUND OF THE INVENTION

1. Field of the Invention

The present invention relates to storage and organizational apparatus, and in particular, to a storage assembly that can be conveniently assembled for use and dis-assembled for transportation or storage.

2. Description of the Prior Art

Knock-down storage systems have been very popular in recent times. Knock-down storage refers to racks having modular components (e.g., shelves, compartments, connectors and support posts) that can be assembled and dis-assembled relatively quickly and conveniently, so that the user can (i) deploy the resulting storage system at any number of different locations, and/or (ii) re-configure the storage system by adding or omitting shelves, compartments and posts.

There are numerous knock-down storage systems that are available in the market. Unfortunately, most of these systems suffer from one of many drawbacks, but the most common problem relates to the convenience of assembling, and dis-assembling, the system. In addition, some connectors are difficult to use, or do not provide sufficient stability. The resulting system should simultaneously meet all of the following objectives: (i) it must allow stable and secure connection of the shelf or compartment to the post, (ii) it must be easy and convenient to assemble and dis-assemble, and (iii) it should have a simple construction to minimize production cost. Unfortunately, none of the currently-available knock-down storage systems meet all of these three objectives.

SUMMARY OF THE INVENTION

It is an object of the present invention to provide a storage system that meets the objectives set forth above.

In order to accomplish the above-described and other objects of the present invention, the present invention provides a storage system comprising a rear frame, a plurality of divider panels, and a plurality of shelving panels. The divider panels include a first divider panel and a second divider panel, each divider panel having a front vertical bar and a rear vertical bar, each divider panel being removably connected to the rear frame adjacent the rear vertical bar. A plurality of U-shaped connectors are provided in spaced apart manner along the front vertical bars and the rear vertical bars of each divider panel. Each shelving panel has a four-sided configuration that defines four corners, with each corner of each shelving panel fitted inside a U-shaped connector.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a storage system that has a simple construction, and which can be easily and conveniently assembled for use, and dis-assembled for storage, re-configuration or transportation. In addition, the connection for each panel or shelf is simple yet provides a stable support for the resulting system.

Referring to FIGS. 1-5, the system 10 of the present invention can be quickly and conveniently assembled by putting together a rear frame 12, a plurality of divider panels 14, 16, 18, and a plurality of shelving panels 20.

Figure 1:
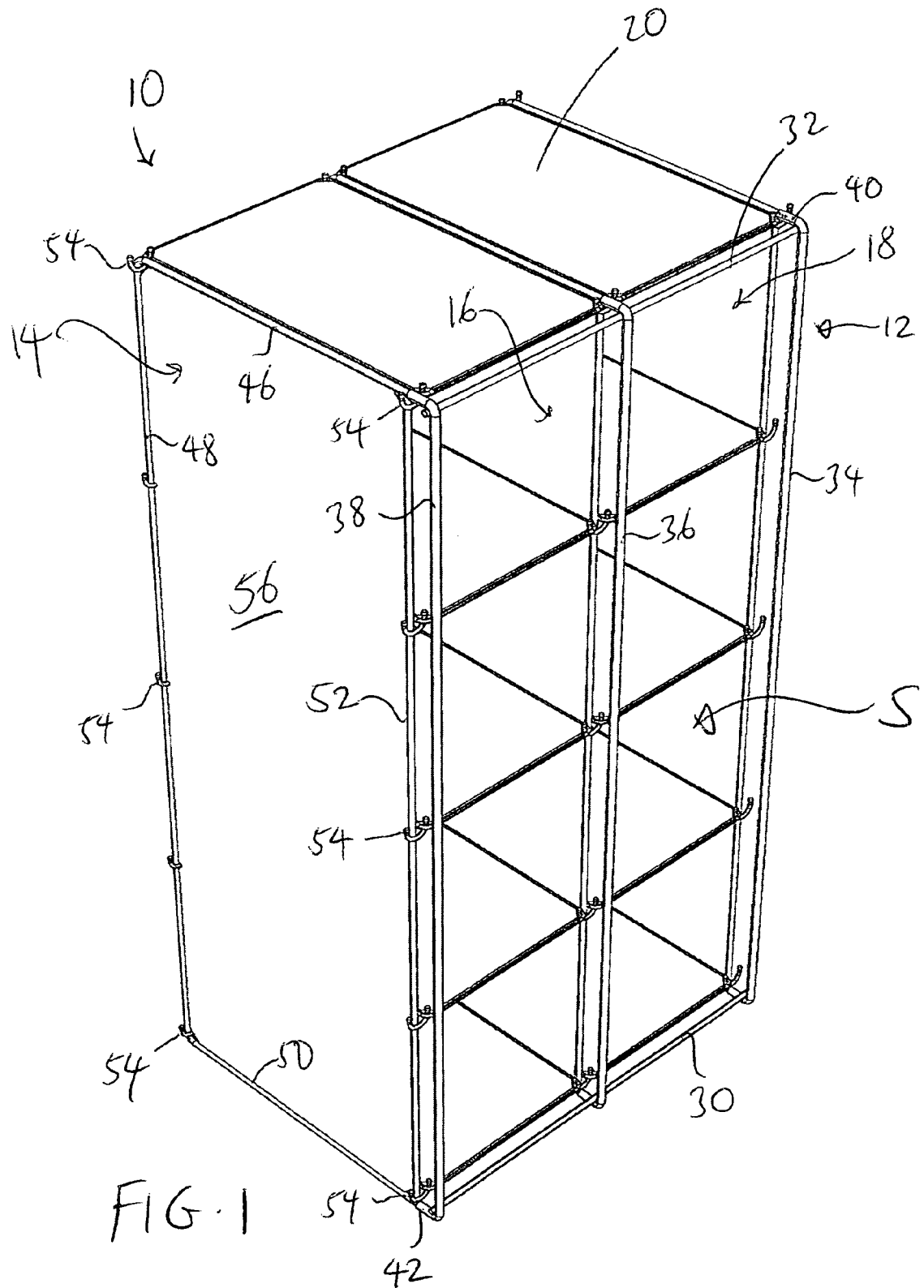
FIG. 1 is a rear perspective view of a storage system according to one embodiment of the present invention.
Figure 5:
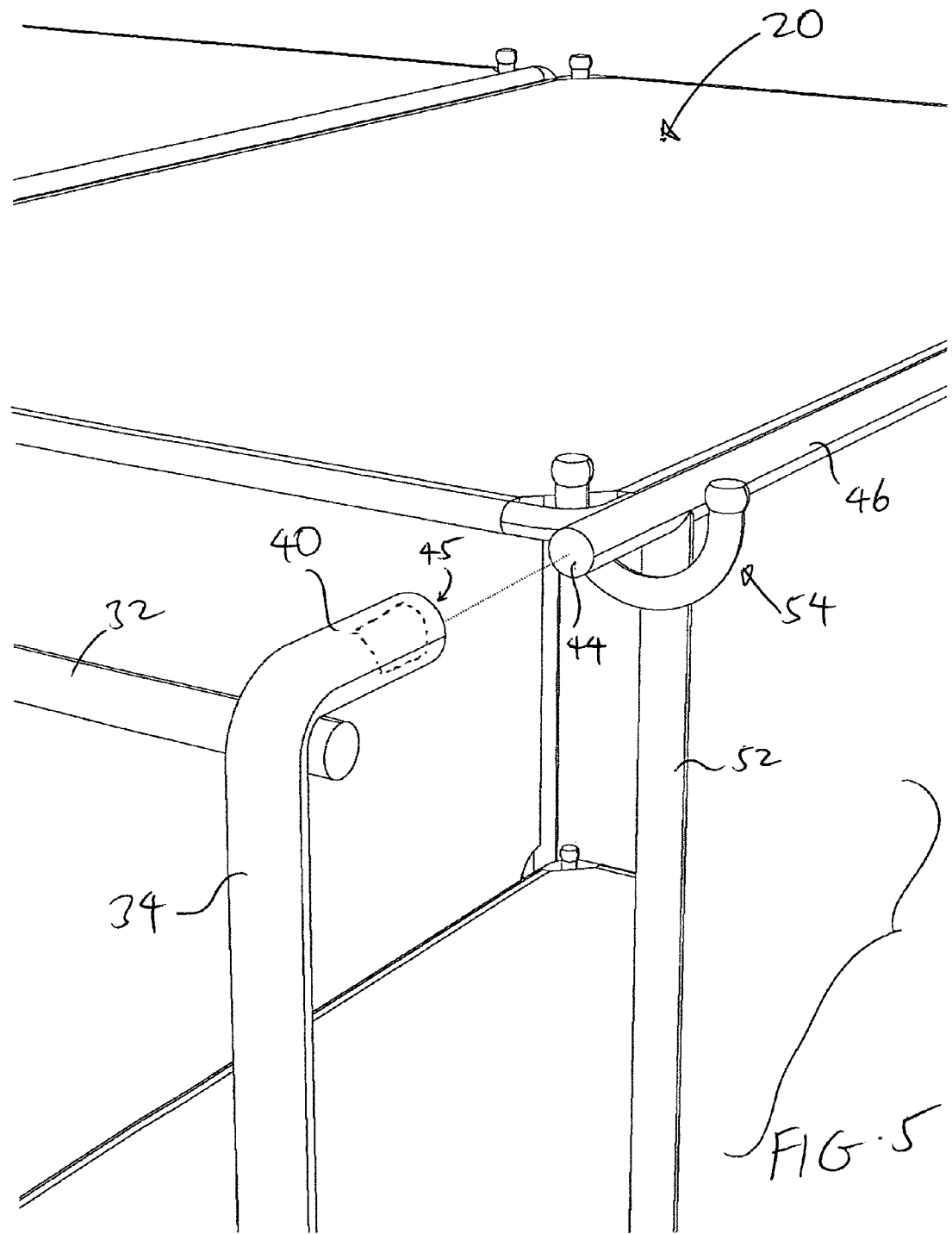
FIG. 5 is an exploded enlarged view showing the connection of a divider panel to the rear frame.

As best shown in FIGS. 1 and 5, the rear frame 12 has a bottom horizontal bar 30, a top horizontal bar 32, and three vertical bars 34, 36, 38. The vertical bar 36 can be a center vertical bar. The bars 30, 32, 34, 36, 38 are connected together (e.g., by welding) or made in one piece, and can be made of a metal. A female connector 40 is provided at the top of each vertical bar 34, 36, 38, and another female connector 42 is provided at the bottom of each vertical bar 34, 36, 38. Each female connector 40, 42 extends transverse to the plane of the bars 30, 32, 34, 36, 38, and has an opening 45 for receiving the end of a shaft 44 of a divider panel 14, 16 or 18.

Each divider panel 14, 16, 18 has the same configuration, and has a four-sided configuration defined by four bars 46, 48, 50, 52. A plurality of U-shaped connectors 54 are welded or otherwise attached to the four bars 46, 48, 50, 52. For example, connectors 54 are attached to the four corners of the divider panels 14, 16 or 18, and additional connectors 54 are attached to the vertical bars 48 and 52. The connectors 54 are aligned so that a connector 54 on one vertical bar 48 is at the same level as a corresponding connector 54 on the other vertical bar 52 of the same divider panel. Shafts 44 extend rearwardly from the horizontal bars 46 and 50, with the shafts 44 adapted to be inserted into the opening 45 of the corresponding female connector 40, 42 for a friction-fit. An optional wall material 56 can be attached to or otherwise provided with the bars 46, 48, 50, 52 in the same plane as the bars 46, 48, 50, 52. The wall material 56 can be made of a cardboard material, plastic, fabric, metal or any material that can be used as a divider.

Each U-shaped connector 54 has a U-shaped body with enlarged opposite ends 58. The center of the U-shaped body is attached to the inner side of the corresponding bar 48 or 52 by welding or similar attachment techniques. Each connector 54 can be provided in the same material as the bars 46, 48, 50, 52.

Each shelving panel 20 has the same configuration, and has a four-sided configuration defined by four bars 60, 62, 64, 66. See FIG. 2. A planar board 70 can be attached to or otherwise provided with the bars 60, 62, 64, 66 in the same plane as the bars 60, 62, 64, 66. The board 70 can be made of a cardboard material, plastic, fabric, metal or any material that is strong enough to be used to support items or objects placed on it. Each corner connection for the bars 60, 62, 64, 66 of the shelving panel 20 can be rounded with an opening 72 defined between the corner connection for the adjacent pair of bars (e.g., 60 and 66) and the board 70. See FIGS. 3 and 4.

Figure 2:
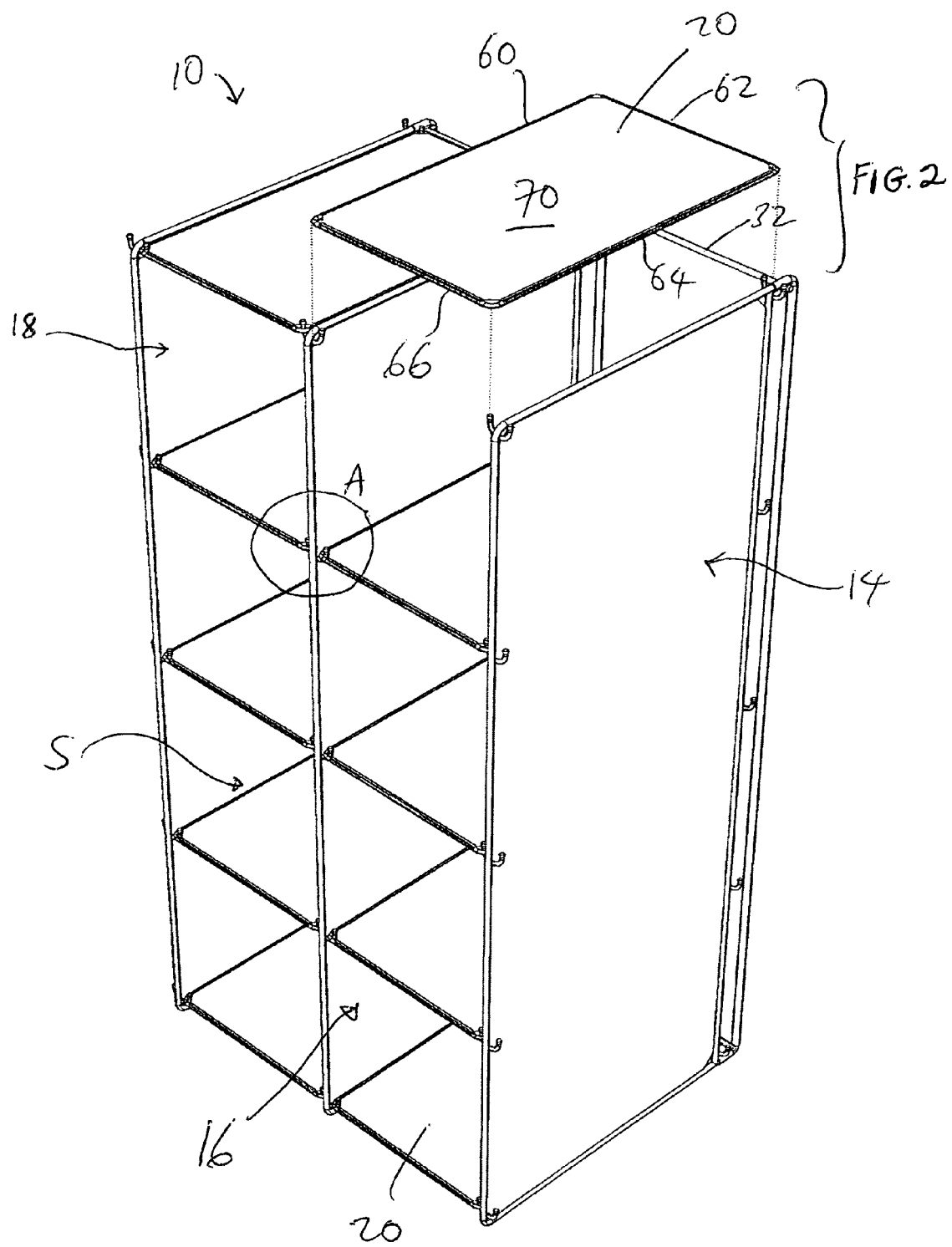
FIG. 2 is an exploded front perspective view of the system of FIG. 1.
Figure 3:
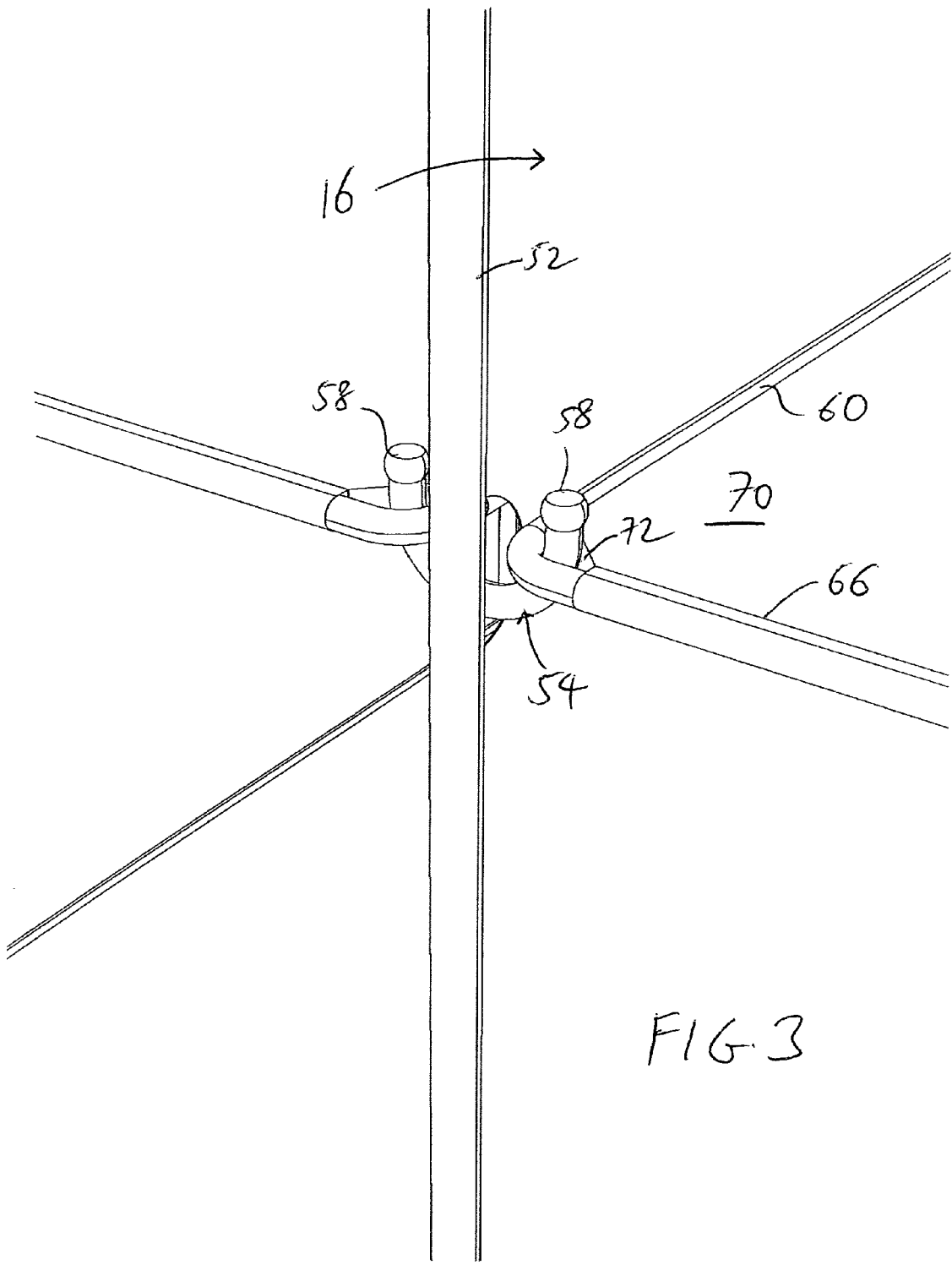
FIG. 3 is an enlarged perspective view of a U-shaped connector and a corner of a shelving panel for the system of FIG. 1, taken from the area A in FIG. 2.
Figure 4:
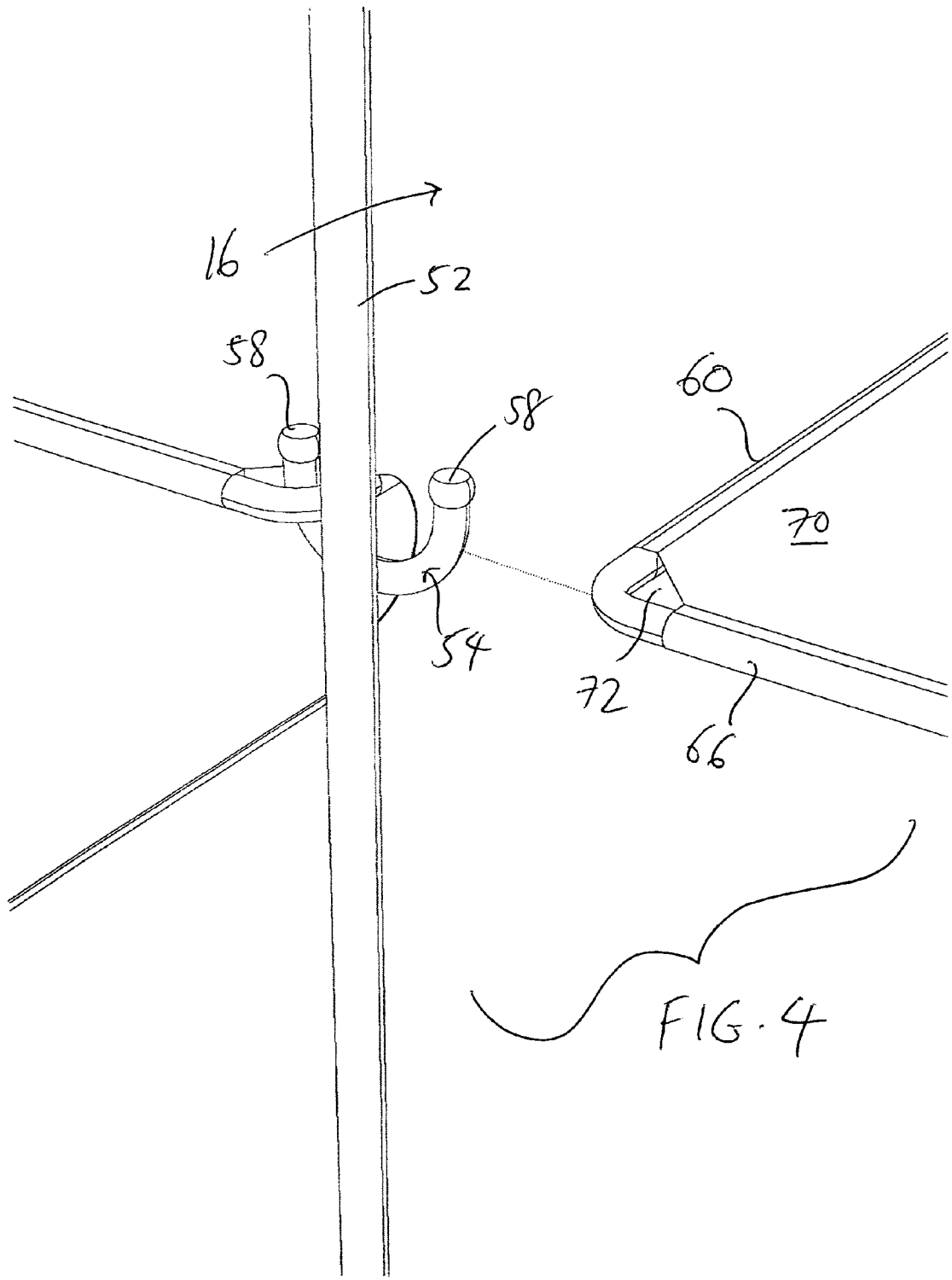
FIG. 4 is an exploded view of FIG. 3.

To assemble the system 10, the divider panels 14, 16, 18 are first attached to the rear frame 12 by inserting the shafts 44 of the divider panels 14, 16, 18 into the openings 45 of each corresponding female connector 40, 42. The shelving panels 20 can then be connected to each set of U-shaped connectors 54. Each set of U-shaped connectors 54 will include four such connectors 54 provided on two adjacent parallel divider panels 14 and 16, or 16 and 18. For example, FIG. 2 shows a shelving panel 20 connected to the four top U-shaped connectors 54 of the divider panels 14 and 16. Referring to FIGS. 3 and 4, the connection is accomplished by inserting an end 58 of a U-shaped connector 54 into each of the four openings 72 of the shelving panel 20. As shown in FIG. 3, when a corner of the shelving panel 20 is resting adjacent the bottom of the U-shaped connector 54, the interaction between the rounded corner of the shelving panel 20 and the U-shaped connector 54 provides a stable connection for the shelving panel 20 to the divider panel 16. The exploded panel 20 in FIG. 2 is coupled to the upper-most connectors 54 along the divider panels 14 and 16 to function as a roof or top panel, with two corners of the exploded panel 20 coupled to one connector 54 each from the bars 48 and 52 of the divider panel 14, and the other two corners of the exploded panel 20 coupled to one connector 54 each from the bars 48 and 52 of the divider panel 16.

The user can choose to utilize or connect as many shelving panels 20 in whatever pattern he or she desires. For example, as shown in FIGS. 1 and 2, shelving panels 20 may be used to form a base or floor for the storage system 10, to form a top or roof, and to form actual shelves intended to hold objects and items such as shoes, among other things. The system 10 in FIGS. 1 and 2 shows two rows of four shelves formed by three divider panels 14, 16, 18, and five shelving panels 20 between each pair of divider panels. Storage spaces S are defined by the divider panels 14, 16 or 16, 18 on either side, and the shelving panels 20 directly above and below. However, this is merely a non-limiting example since the modularity of the system 10 and its components allows the user to assemble storage systems 10 of different sizes and shapes. For example, one or more of the shelving panels 20 can be omitted (not used) in FIG. 1 to provide a larger storage space S so that one of the shelves can be used to store larger objects. Alternatively, four divider panels can be used to form three rows of shelves. In addition, the number of U-shaped connectors 54 on the divider panels 14, 16, 18 can be varied, and positioned at different locations, to provide different numbers of storage spaces S, and to provide storage spaces S of varying sizes.

To dis-assemble the system 10, the user simply lifts up the corners of each shelving panel 20 to disengage each shelving panel 20. The divider panels 14, 16, 18 can be disengaged from the rear frame 12 by merely pulling the shafts 44 of the divider panels 14, 16, 18 from the female connectors 40, 42 of each vertical bar 34, 36, 38. Then, the rear frame 12, the divider panels 14, 16, 18, and the shelving panels 20 can be stacked on top of each other for transportation or storage.

Thus, the U-shaped connectors 54 allow for quick and convenient assembly and dis-assembly, yet provides sufficient stability to the resulting system 10.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A storage system, comprising:
    a rear frame;
    a plurality of divider panels, including a first divider panel and a second divider panel, each divider panel having a front vertical bar and a rear vertical bar, each divider panel being removably connected to the rear frame adjacent the rear vertical bar;
    a plurality of U-shaped connectors provided in spaced apart manner along the front vertical bar and the rear vertical bars of each divider panel; and
    a plurality of shelving panels, each shelving panel having a four-sided configuration that defines four corners, with each corner of each shelving panel fitted inside a U-shaped connector.

2. The system of claim 1, wherein each U-shaped connector has a U-shaped body with opposite enlarged ends.

3. The system of claim 1, wherein each U-shaped connector is attached to a vertical bar of a divider panel at about the center of the U-shaped connector.

4. The system of claim 1, wherein the U-shaped connectors along the rear vertical bar of each divider panel are provided at the same level as the U-shaped connectors along the front vertical bar of the corresponding divider panel, so that when all the corners of a shelving panel are fitted inside U-shaped connectors from two adjacent divider panels, the shelving panel is oriented at the same horizontal level.

5. The system of claim 1, wherein the divider panels and shelving panels define a plurality of storage spaces, with each storage space defined by two adjacent divider panels and two adjacent shelving panels positioned between the two adjacent divider panels.

6. The system of claim 1, wherein the rear frame has a plurality of female connectors, and each divider panel has a shaft that is fitted inside one of the female connectors.

7. The system of claim 1, wherein the rear frame has a plurality of vertical bars, with each vertical bar of the rear frame corresponding to one divider panel.

8. The system of claim 1, wherein each divider panel has a perimeter defined by the front and rear vertical bars, as well as two horizontal bars.

9. The system of claim 8, wherein each divider panel further includes a wall material attached to the front and rear vertical bars, and two horizontal bars, of the dividing panel, in the same plane as the front and rear vertical bars, and two horizontal bars, of the dividing panel.

10. The system of claim 1, wherein each shelving panel has four bars, and a planar board attached to the four bars of the shelving panel in the same plane as the four bars of the shelving panel.

11. A storage system, comprising:
    a rear frame;
    a plurality of divider panels, including a first divider panel and a second divider panel, each divider panel having a front vertical bar and a rear vertical bar, each divider panel being removably connected to the rear frame adjacent the rear vertical bar;
    a plurality of U-shaped connectors provided in spaced apart manner along the front vertical bar and the rear vertical bars of each divider panel, each U-shaped connector having a U-shaped body with opposite enlarged ends, and attached to a vertical bar of a divider panel at about the center of the U-shaped body; and
    a plurality of shelving panels, each shelving panel having a four-sided configuration that defines four corners, with each corner of each shelving panel fitted inside a U-shaped connector.

12. The system of claim 11, wherein the U-shaped connectors along the rear vertical bar of each divider panel are provided at the same level as the U-shaped connectors along the front vertical bar of the corresponding divider panel, so that when all the corners of a shelving panel are fitted inside U-shaped connectors from two adjacent divider panels, the shelving panel is oriented at the same horizontal level.

13. The system of claim 11, wherein the divider panels and shelving panels define a plurality of storage spaces, with each storage space defined by two adjacent divider panels and two adjacent shelving panels positioned between the two adjacent divider panels.

14. A method of assembling a storage system, comprising:
   i. providing a storage system, comprising:
      a rear frame;
      a plurality of divider panels, including a first divider panel and a second divider panel, each divider panel having a front vertical bar and a rear vertical bar;
      a plurality of U-shaped connectors provided in spaced apart manner along the front vertical bar and the rear vertical bars of each divider panel; and
      a plurality of shelving panels, each shelving panel having a four-sided configuration that defines four corners;
   ii. connecting a portion of each divider panel to the rear frame adjacent the rear vertical bar; and
   iii. fitting each corner of a shelving panel inside corresponding U-shaped connectors at the same vertical level of two adjacent divider panels.

15. The method of claim 14, wherein each U-shaped connector includes a U-shaped body and two opposing ends, and wherein step (iii) includes inserting an opposing end of each U-shaped connector into an opening at each corner of each shelving panel.

* * * * *